3,655,699
ANALOGUES OF LAPACHOL AS ANTITUMOR AGENTS

Herman Rutner, Hackensack, N.J., assignor to Pfizer Inc., New York, N.Y.
No Drawing. Filed Mar. 2, 1970, Ser. No. 15,849
Int. Cl. C07c 49/66
U.S. Cl. 260—396 K                    3 Claims

ABSTRACT OF THE DISCLOSURE

The preparation of certain novel analogues of lapachol and the activity of these compounds against Walker 256 carcinosarcoma in rats is disclosed.

BACKGROUND OF THE INVENTION

The testing of plant extracts is an important part of antitumor screening programs. Lapachol [2-hydroxy-3-(3 - methyl - 2 - butenyl) - 1,4 - naphthoquinone] is a yellow pigment found in the grain of a number of woods, including Surinam greenheart, Taigu wood, Lapachol heartwood and Bethabarra wood. It may be isolated by extraction of the ground wood with cold 1% aqueous sodium carbonate solution, precipitation, and extraction of the dried solid with ether. Its activity against Walker 256 carcinosarcoma in rats was reported by Rao et al., Cancer Research 28, 1952–1954 (1968).

This invention relates to the synthesis of analogues of lapachol that exhibit greater activity than the parent compound against Walker 256 carcinosarcoma in rats.

SUMMARY OF THE INVENTION

It has been found that various novel analogues are more active than lapachol, itself, in inhibiting the growth of Walker 256 carcinosarcoma in rats. The compounds of this invention are analogues of lapachol in which both sidechain terminal methyl groups are replaced, for example, by halogens or other groups in which R is trifluoromethyl or where R and R taken together form carbocyclic rings containing 3 to 6 carbon atoms.

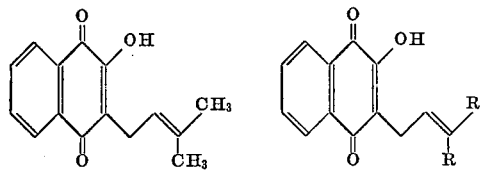

DETAILED DESCRIPTION OF THE INVENTION

The general reaction scheme for the preparation of the compounds of this invention is as follows:

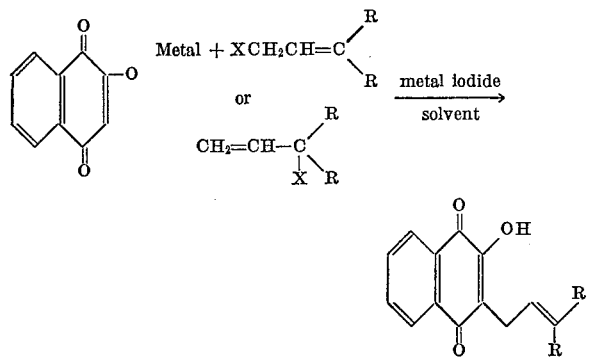

The common starting material in the overall preparation of analogues of lapachol is 2-hydroxy - 1,4 - naphthoquinone (lawsone) which is a readily available commercial product. By conventional methods this compound is converted to a metal salt. Barium, silver and other metal salts of 2 - hydroxy - 1,4 - naphthoquinone are suitable intermediates in the alkylation reaction. However, the lithium, sodium or potassium salts are preferred reactans with suitable primary and tertiary allylic halides. The halogen (X) in the alkylating agents may be Cl, Br or I, with the bromides the most generally used derivatives.

The metal salt of 2 - hydroxy - 1,4 - naphthoquinone is added to a solution of the appropriate allylic halide. The yield of desired alkylation product is increased by the addition of a metal iodide which converts the allylic halide (chloride or bromide) to the more reactive allylic iodide. The metal iodide may be an alkaline earth metal iodide such as calcium or magnesium iodide or an alkali metal iodide such as sodium, potassium or lithium iodide. Potassium iodide is the most commonly used compound.

The choice of solvent for the alkylation reaction is an important determinant. Tetrahydrofurane, dioxane, benzene and isopropanol are not suitable. Hexamethylphosphoramide, tetramethylenesulfone, N-methylpyrrolidone and other dipolar aprotic solvents are satisfactory. The preferred solvent is dimethylsulfoxide, followed in decreasing order by formamide, dimethylacetamide and dimethylformamide.

The proportion of reactants is on a mole for mole basis plus 10% excess. Sufficient solvent is added to allow for vigorous agitation of the reaction mixture.

To those skilled in the art, the interdependence of temperature and time in chemical reactions is well known. Bearing this in mind, the reaction proceeds at ambient temperature (30–50° C.) in 16–24 hours. Heating to 50–60°C. for 3–4 hours near the end of the reaction increases the yields slightly. Higher temperatures (e.g. 100° C.) for 1 hour promote cyclization of sensitive side chains.

After completion of the reaction, the mixture is quenched with water. The reaction product is removed by filtration or other means, and dissolved in a water-immiscible solvent such as chloroform. The solvent solution is extracted several times with sodium bicarbonate solution which selectively removes unreacted 2-hydroxy-1,4-naphthoquinone. Dilute sodium hydroxide or 5% sodium carbonate solution is then used to extract the less acidic lapachol analogue from the organic solvent while neutral compounds including O-alkylation products remain in the organic solvent phase. The alkaline solution is neutralized, and the lapachol analogue is re-extracted into chloroform or other water-immiscible organic solvent. Concentration of the solvent and recrystallization from solvent mixtures yields the pure product.

Synthetic procedures for the preparation of several of the sidechain intermediates are reported by Hatch, L. F. and Zimmerman, S. D., J. Am. Chem. Soc., 79, 3091–3093 (1957); Andrac, M., Ann. Chim. (Paris) 9, 288–293 (1964); Marcou, A. and Normant, H., Bull. Soc. Chim. 1400–1404 (1966).

The compounds of this invention are effective against the Walker 256 carcinosarcoma in rats when tested according to the protocol of Cancer Chemotherapy Reports No. 25, page 12, December 1962. The tumor cells are implanted intramuscularly in the thigh of non-inbred albino rats, six animals per test group. Treatment is begun 3 days after implant. Results are expressed as percent of tumor weight inhibition.

The following examples are merely illustrative and are not intended to limit the invention, the scope of which is defined by the appended claims.

Example I

The lithium salt of 2-hydroxy-1,4-naphthoquinone (48 g., 0.25 mole) in 450 ml. of stabilized formamide (Fisher Scientific Co.) is treated with 77 g. of 1,1,3-tribromo-1-propene (0.28 mole). Potassium iodide (41.5 g., 0.25 mole) is added in portions to control the mildly exothermic reaction, and the reaction mixture is stirred at room temperature for 16–24 hours. After heating to approximately 50° C. for 4 hours, the reaction mixture is cooled and diluted with 1.5 liters of water. The precipitated solids are filtered off, washed with water and dissolved in 1.5 liters of chloroform.

The chloroform solution is washed 3 times with 300 ml. portions of 5% sodium bicarbonate to remove 2-hydroxyl - 1,4-naphthoquinone, and then extracted once with 1.0 liter and twice with 0.5 liter portions of 5% sodium carbonate. The sodium carbonate extracts are washed once with 0.25 liter of chloroform, acidified to pH 7.5–8.0 with HCl and re-extracted with three 0.5 liter portions of chloroform. The chloroform extract is dried and concentrated in vacuo to a thick suspension. The suspension is diluted with sufficient methanol to effect solution at the boiling point. After cooling to room temperature, the suspension is concentrated in vacuo to a thick slurry, filtered and washed with methanol. Recrystallization from benzene-ligroin affords a 28% yield of golden-yellow plates of 2 - (3,3-dibromoallyl)-3-hydroxy-1,4 - naphthoquinone, M.P. 171.5–172.5° C.

Example II

The method of Example I is repeated using 3-bromo-1,1 - dichloro - 1 - propene in place of 1,1,3-tribromo-1-propene to provide a yield of 2 - (3,3 - dichloroallyl)-3-hydroxy-1,4-napthoquinone, M.P. 158–159° C.

Example III

To a solution of (2 - bromoethylidene)cyclopentane (90 g., 0.52 mole) in 400 ml. anhydrous dimethylsulfoxide, 88 g. (0.42 mole) potassium salt of 2 - hydroxy-1,4 - naphthoquinone is added in portions with stirring. After the initial mildly exothermic reaction subsides, 87 g. (0.52 mole) potassium iodide is added. The suspension is stirred at ambient temperature for 16 to 24 hours and then at 50–60° C. for 4 hours to complete the reaction.

The cooled reaction mixture is added to 2.0 liters of cold water, and the pH is adjusted to 5–6. After stirring for ½ hour, the precipitated solids are filtered off and washed with water to remove dimethylsulfoxide. The wet cake is dissolved in a mixture of 1.5 liters chloroform and 0.5 liter 5% sodium bicarbonate, and filtered through diatomaceous earth. The layers are separated and the chloroform layer is washed twice with 0.5 liter 5% sodium bicarbonate.

The product is extracted from the chloroform with 4 portions of 400 ml. 0.2 M NaOH from which it is re-extracted into chloroform (3 × 400 ml.) at pH 7–8. Concentration and crystallization from benzene-ligroin (1:2) yields 21.8 g. (20%) of golden-yellow crystals of 2-(2-cyclopentylideneethyl)-3-hydroxy - 1,4 - naphthoquinone, M.P. 152–153° C.

Example IV

The method of Example III is repeated using (2-bromoethylidene)cyclohexane in place of (2-bromoethylidene)cyclopentane to give a 16% yield of crystalline 2-(2-cyclohexylideneethyl)-2-hydroxy-1,4-naphthoquinone, M.P. 115–116° C.

Example V

Intermediate I: 1,1,1-trifluoro-2 - trifluoromethyl - 3-buten-2-ol.—To a 3-neck flask equipped with a thermometer, a stirrer and a reflux condenser cooled with Dry Ice-acetone is added 650 ml. 2.29 M vinylmagnesium chloride in tetrahydrofuran (1.49 moles). Gaseous hexafluoroacetone is bubbled into the mixture at a rate such that a temperature of −10 to 0° C. is maintained with external cooling. Addition of the hexafluoroacetone is continued for approximately 15 minutes beyond the point at which the exothermic reaction subsides. The reaction mixture is stirred for about an hour at 0 to 10° C., cooled to −10° C. and quenched by slow addition of 60 ml. saturated ammonium chloride solution. The thick slurry is diluted with 400 ml. petroleum ether and acidified with 530 ml. 3 N HCl. The solvent layer is separated, washed twice with water and dried over anhydrous magnesium sulfate. The filtrate is fractionated at atmospheric pressure. The product, 1,1,1-trifluoro-2 - trifluoromethyl - 3-buten-2-ol, distills as the 1:1 adduct with tetrahydrofuran, B.P. 99–102° C.; yield, 368 grams.

Intermediate II: 1,1 - bis(trifluoromethyl)allyl p-bromobenzenesulfonate.—To a suspension of 0.315 mole sodium hydride in 150 ml. anhydrous ethyl ether (prepared by diluting 13.4 g. 57% sodium hydride in mineral oil with petroleum ether and decanting), a solution of 80 g. (0.30 mole) 1,1,1 - trifluoro-2 - trifluoromethyl - 3 - buten - 2 - ol:tetrahydrofuran adduct in 250 ml. anhydrous ether is added at a temperature of 0 to 10° C. After stirring for one-half hour without cooling, a solution of 73.2 g. (0.285 mole) p-bromobenzenesulfonyl chloride in 200 ml. anhydrous tetrahydrofuran is added and the mixture is refluxed for 6 hours, and then concentrated in vacuo.

The concentrate is diluted with 0.5 liter ethyl ether and washed successively with two portions of ice water and two portions of saturated sodium chloride solution. After drying with anhydrous magnesium sulfate, the solvent is removed in vacuo. The residue crystallizes from petroleum ether on partial evaporation and cooling to yield 75 g. of 1,1-bis(trifluoromethyl)allyl p-bromo-benzenesulfonate, M.P. 50–51° C.

Intermediate III: 3,3-bis(trifluoromethyl)allyl iodide.— A suspension of 84.4 g. (0.205 mole) 1,1-bis(trifluoromethyl)allyl p-bromobenzenesulfonate and 41.5 g. (0.25 mole) potassium iodide in 200 ml. anhydrous dimethylsulfoxide is stirred at 25° C. for 16 hours in the dark. The volatile products are distilled in vacuo (0.1–1.0 mm. Hg) over a temperature range of 20 to 40° C. and collected in two receivers connected in series. The second receiver is cooled in dry-acetone, and condenses the 3,3-bis(trifluoromethyl)allyl iodide to yield 39 g. of the yellow liquid of 95% purity.

Preparation: 2 - hydroxy - 3 - (4,4,4-trifluoro-3-[trifluoromethyl]-2-butenyl)-1,4 - naphthoquinone.—A mixture of 33.5 g. (0.12 mole) silver salt of 2-hydroxy-1,4-naphthoquinone and 28.7 g. (0.095 mole) 3-3-bis(trifluoromethyl)allyl iodide in 150 ml. benzene is stirred for 48 hours at room temperature under exclusion of air and light. The silver iodide and the excess starting material are filtered off and washed with benzene.

The filtrate is evaporated to dryness in vacuo. The residue, dissolved in 300 ml. chloroform, is washed 3 times with 200 ml. 0.1 M pH 7.0 phosphate buffer, and then rapidly extracted with two 250 ml. portions of 2% sodium carbonate solution. The sodium carbonate extracts are rapidly adjusted to pH 7.5–8.0 with dilute HCl, and extracted twice with 200 ml. portions of chloroform. The chloroform extract is washed with 100 ml. 0.1 M pH 5.0 citrate buffer, dried and evaporated in vacuo. Recrystallization from benzene affords 2.80 g. of the hexafluoro analogue of lapachol as yellow crystals, M.P. 161–163° C.

Example VI

The compounds of this invention are more active than lapachol against the Walker 256 carcinosarcoma in rats. Comparison test results of lapachol with the dibromo-analogue, 2 - (3,3-dibromoallyl)-3-hydroxy-1,4-naphthoquinone, and the dichloroanalogue, 2-(3,3-dichloroallyl)-3 - hydroxy - 1,4 - naphthoquinone, are shown in the following table where MTD, the maximum tolerated dose, is defined as that dose producing 10% mortality; MED, the minimum effective dose, is that dose producing minimum significant tumor inhibition; T.I., the therapeutic index, is the ratio of the maximum tolerated dose to the minimum effective dose; Max. TWI (percent), maximum tumor weight inhibition, the percent tumor inhibition obtainable at the maximum tolerated dose:

| Compound | Route[1] | Regimen[2] | MTD (mg./kg.) | MED (mg./kg.) | T.I. | Max. TWI (percent) |
|---|---|---|---|---|---|---|
| Lapachol | I.P. | D 3-6 | 280 | 125 | 2.2 | 80 |
| | I.P. | D 3-6 (BID) | 340 | 100 | 3.4 | 80 |
| | I.M. | D 3-6 (BID) | 350 | 120 | 2.9 | 83 |
| | I.V. | D 3-6 | 40 | Inactive | | |
| | P.O. | D 3-6 | 560 | 95 | 6.0 | 92 |
| | P.O. | D 3-6 (BID) | 740 | 74 | 10.0 | 94 |
| Dibromoanalogue | I.P. | D 3-6 | 300 | 30 | 10.0 | 90 |
| | I.P. | D 3-6 (TID) | 240 | 21 | 11.4 | 95 |
| | I.M. | D 3-6 (TID) | 110 | <10 | >11.0 | 93 |
| | I.V. | D 3-6 | 120 | 38 | 3.2 | 86 |
| | P.O. | D 3-6 | 680 | 30 | 22.0 | 97 |
| | P.O. | D 1 only | 640 | 230 | 2.8 | 90 |
| | P.O. | D 3 only | >1,000 | 230 | >4.0 | 95 |
| Dichloroanalogue | I.P. | D 3-6 | 66 | 8.5 | 7.8 | 96 |
| | I.V. | D 3-6 | 30 | 9.0 | 3.3 | 82 |
| | P.O. | D 3-6 | 200 | 6.5 | 30.0 | 97 |

[1] Routes: I.P., intraperitoneal; I.M., intramuscular; I.V. intravenous; P.O. oral.
[2] Regimen:
 D 3-6, treatment days.
 BID, treatments twice daily.
 TID, treatments three times daily.

What is claimed is:

1. Compounds of the formula:

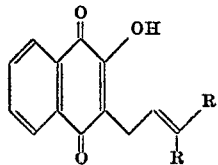

wherein R is halogen.

2. 2-(3,3-dichloroallyl)-3 - hydroxy - 1,4 - naphthoquinone.

3. 2 - (3,3 - dibromoallyl) - 3-hydroxy-1,4-naphthoquinone.

References Cited

UNITED STATES PATENTS

| | | | |
|---|---|---|---|
| 2,352,528 | 6/1944 | Fieser | 260—396 |
| 2,553,647 | 5/1951 | Fieser et al. | 260—396 |
| 2,553,648 | 5/1951 | Fieser et al. | 260—396 |
| 2,572,946 | 10/1951 | Paulshack | 260—396 |

JAMES A. PATTEN, Primary Examiner

V. GARNER, Assistant Examiner

U.S. Cl. X.R.

260—456 P, 633, 653.3; 424—331